US011126685B2

(12) United States Patent
Chen et al.

(10) Patent No.: US 11,126,685 B2
(45) Date of Patent: Sep. 21, 2021

(54) PREVIEW AND OPTIMIZATION OF PUBLICATION FOR TARGET COMPUTING DEVICE

(71) Applicant: eBay Inc., San Jose, CA (US)

(72) Inventors: Ping Chen, San Jose, CA (US); Glebs Riskovs, San Jose, CA (US); Scot Fraser Hamilton, Dublin, CA (US); Anh DeCroix, San Jose, CA (US); Peter David Copeland, San Jose, CA (US); Amol Vilas Sane, San Jose, CA (US)

(73) Assignee: eBay Inc., San Jose, CA (US)

( * ) Notice: Subject to any disclaimer, the term of this patent is extended or adjusted under 35 U.S.C. 154(b) by 429 days.

(21) Appl. No.: 15/795,762

(22) Filed: Oct. 27, 2017

(65) Prior Publication Data

US 2018/0121560 A1 May 3, 2018

Related U.S. Application Data

(60) Provisional application No. 62/414,559, filed on Oct. 28, 2016.

(51) Int. Cl.
*G06F 16/957* (2019.01)
*G06F 16/44* (2019.01)
(Continued)

(52) U.S. Cl.
CPC ........ *G06F 16/9577* (2019.01); *G06F 16/444* (2019.01); *G06F 16/954* (2019.01);
(Continued)

(58) Field of Classification Search
None
See application file for complete search history.

(56) References Cited

U.S. PATENT DOCUMENTS 7,085,999 B2 * 8/2006 Maeda ................ G06F 16/9577
715/236
8,176,416 B1 * 5/2012 Williams ............ G06F 17/2247
715/243
(Continued)

FOREIGN PATENT DOCUMENTS

WO 2018/081525 A1 5/2018

OTHER PUBLICATIONS

International Search Report and Written Opinion received for PCT Patent Application No. PCT/US2017/058707, dated Jan. 26, 2018, 9 pages.
(Continued)

*Primary Examiner* — Howard Cortes
(74) *Attorney, Agent, or Firm* — FIG. 1 Patents

(57) ABSTRACT

Methods, systems, and computer programs are presented for optimizing an input publication with augmented content for optimization across multiple types of computing devices. An input publication is analyzed to extract structure and meaning from the input publication to match the input publication with a standardized publication of a standardized publication catalog, the standardized publication having content that is optimized be displayed on a plurality of computing devices. A preview of the input publication is provided with the content from the standardized publication that is optimized be displayed on a particular computing device. A publication corpus is updated to include the input publication with the content from the standardized publication that is optimized be displayed on the particular computing device.

20 Claims, 15 Drawing Sheets

(51) Int. Cl.
  *G06F 16/954* (2019.01)
  *G06K 9/00* (2006.01)
  *G06K 9/62* (2006.01)
  *G06F 40/137* (2020.01)
  *G06F 40/143* (2020.01)

(52) U.S. Cl.
  CPC .......... *G06F 40/137* (2020.01); *G06F 40/143* (2020.01); *G06K 9/00442* (2013.01); *G06K 9/6267* (2013.01)

(56) References Cited

U.S. PATENT DOCUMENTS

| | | | |
|---|---|---|---|
| 8,181,107 B2* | 5/2012 | Melnyk | H04L 67/2823 715/238 |
| 8,788,944 B1 | 7/2014 | Gill et al. | |
| 9,372,858 B1* | 6/2016 | Vagell | G06F 40/166 |
| 9,846,686 B2* | 12/2017 | Scoda | G06F 17/2247 |
| 2002/0107891 A1 | 8/2002 | Leamon et al. | |
| 2003/0030636 A1 | 2/2003 | Yamaoka | |
| 2003/0135649 A1* | 7/2003 | Buckley | G06F 3/1454 709/247 |
| 2004/0263530 A1 | 12/2004 | Sahuc et al. | |
| 2004/0268248 A1* | 12/2004 | Makela | G06F 16/9577 715/234 |
| 2005/0172224 A1 | 8/2005 | Kobashi et al. | |
| 2005/0268230 A1* | 12/2005 | Bales | G06F 40/117 715/255 |
| 2006/0146071 A1 | 7/2006 | Morita et al. | |
| 2006/0288278 A1* | 12/2006 | Kobayashi | G06F 17/212 715/209 |
| 2007/0174291 A1 | 7/2007 | Cooper et al. | |
| 2007/0245232 A1* | 10/2007 | Wake | G06F 40/106 715/234 |
| 2007/0271510 A1* | 11/2007 | Grigoriu | G06F 40/232 715/257 |
| 2009/0106653 A1* | 4/2009 | Lee | G06F 17/211 715/273 |
| 2009/0144614 A1* | 6/2009 | Dresevic | G06F 17/2205 715/239 |
| 2009/0319927 A1* | 12/2009 | Beeman | G06F 40/166 715/764 |
| 2010/0099441 A1 | 4/2010 | Agarwal et al. | |
| 2010/0211866 A1* | 8/2010 | Nicholas | G06F 17/212 715/234 |
| 2010/0228693 A1* | 9/2010 | Dawson | G06F 17/2705 706/12 |
| 2010/0257182 A1* | 10/2010 | Saliba | G06F 40/253 707/747 |
| 2013/0080887 A1* | 3/2013 | Hou | G06F 40/205 715/273 |
| 2013/0097238 A1* | 4/2013 | Rogers | H04L 67/141 709/204 |
| 2013/0124532 A1* | 5/2013 | McQuarrie | G06F 40/106 707/748 |
| 2013/0174012 A1* | 7/2013 | Kwan | G06F 16/958 715/234 |
| 2013/0339830 A1* | 12/2013 | Yuan | G06F 3/0485 715/209 |
| 2014/0046910 A1* | 2/2014 | Nathan | G06F 16/2365 707/690 |
| 2014/0081616 A1* | 3/2014 | Poulin | G06F 11/3457 703/22 |
| 2014/0089786 A1* | 3/2014 | Hashmi | G06F 16/957 715/234 |
| 2014/0222553 A1* | 8/2014 | Bowman | G06Q 30/0276 705/14.45 |
| 2015/0113390 A1* | 4/2015 | Vagell | G06F 40/106 715/255 |
| 2015/0220490 A1* | 8/2015 | Barber | G06F 17/212 715/234 |
| 2015/0248382 A1* | 9/2015 | Shin | G06F 17/2247 715/239 |
| 2015/0310124 A1* | 10/2015 | Ben-Aharon | G06F 40/106 715/205 |
| 2016/0034601 A1* | 2/2016 | Rothberg | G06F 16/9577 715/251 |
| 2016/0048605 A1* | 2/2016 | Baldwin | G06F 16/986 715/235 |
| 2016/0210689 A1* | 7/2016 | Hummel | G06Q 30/08 |
| 2017/0220587 A1* | 8/2017 | Srinivasan | G06F 17/212 |
| 2017/0237616 A1* | 8/2017 | Akella | G06F 8/20 715/735 |
| 2018/0374225 A1* | 12/2018 | Edge | G06T 7/12 |
| 2020/0285803 A1* | 9/2020 | Edge | G06F 40/103 |

OTHER PUBLICATIONS

Fance, "HONGKAIT-18 (More) Services to Convert Websites for Mobile Devices", Retrieved from the Internet URL: <https://www.hongkiat.com/blog/convert-websites-for-mobile-devices-part-2/>, Accessed on Jan. 20, 2018, 19 pages.

International Preliminary Report on Patentability received for PCT Application No. PCT/US2017/058707, dated May 9, 2019, 8 pages.

* cited by examiner

PREVIEW AND OPTIMIZATION OF PUBLICATION FOR TARGET COMPUTING DEVICE

TECHNICAL FIELD

The subject matter disclosed herein generally relates to the technical field of special-purpose machines that facilitate optimization of an input publication for display in multiple types of target computing devices.

BACKGROUND

When posting a listing on a network-based publication system, users may not easily be able to optimize the presentation of the listing for all of the computing devices on which the product listing may ultimately be displayed.

BRIEF DESCRIPTION OF THE DRAWINGS

Various ones of the appended drawings merely illustrate example embodiments of the present disclosure and cannot be considered as limiting its scope.

FIG. 7 is an example of a seller provided product description.

FIG. 11 is an example of a seller saving the optimized content, and the system adding optimization code into the seller provided product description.

FIG. 12 is an example of a desktop browser rendered seller product description.

DETAILED DESCRIPTION

Figure 1:
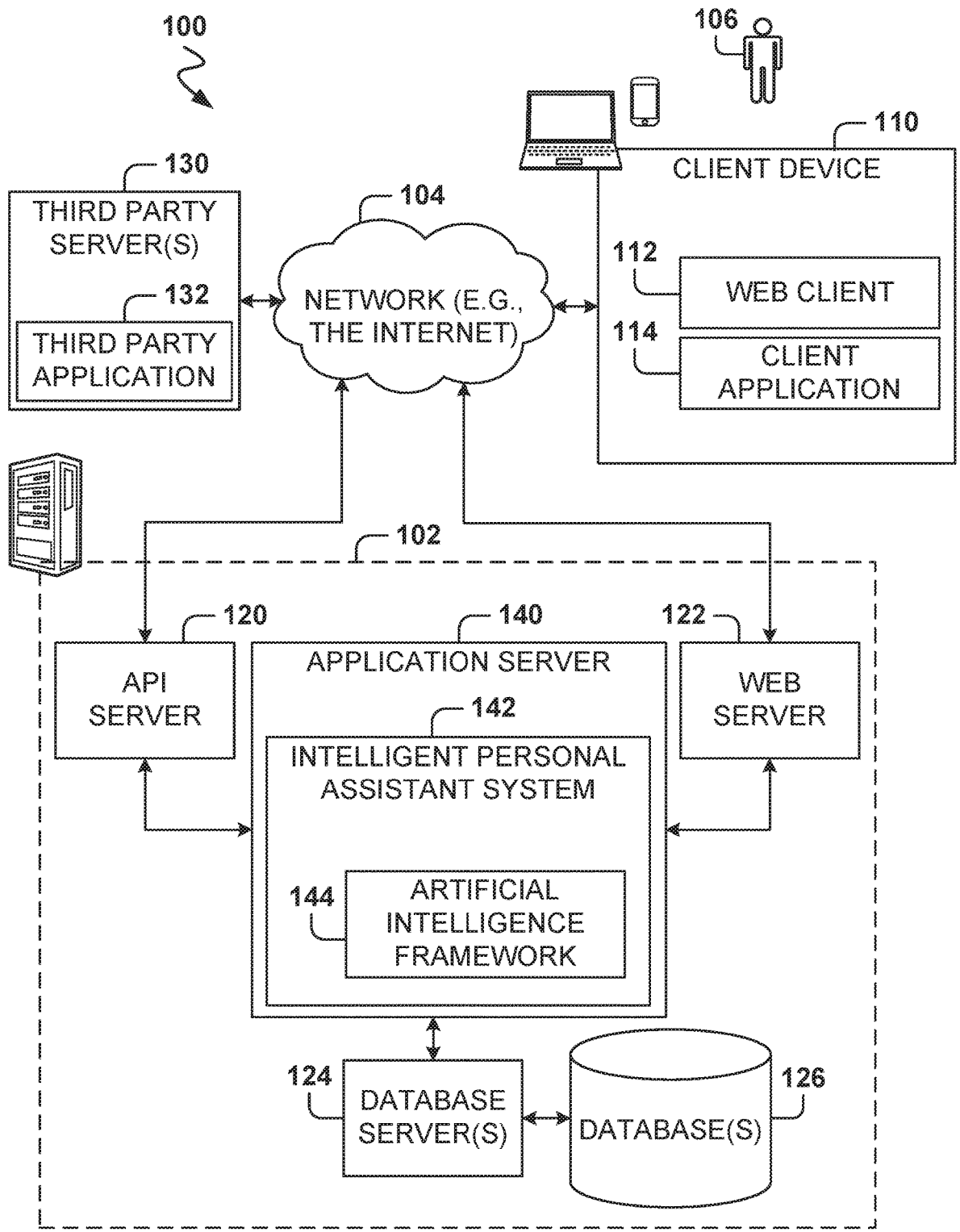
FIG. 1 is a block diagram illustrating a networked system, according to some example embodiments.

Example methods, systems, and computer programs are directed to adding new features to a network service such as image recognition, image signatures generation, and category prediction performed form an input image. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In example embodiments, a method of generating custom user interfaces to allow a user to optimize a product listing for presentation on a particular computing device is disclosed. An input publication unoptimized to be displayed on a particular computing device is received. The input publication is analyzed to extract structure and meaning from the input publication to match the input publication with a standardized publication of a standardized publication catalog. The standardized publication has content that is optimized be displayed on a plurality of computing devices. A preview is provided of the input publication with the content from the standardized publication that is optimized be displayed on the particular computing device. A publication corpus is updated to include the input publication with the content from the standardized publication that is optimized be displayed on the particular computing device.

In example embodiments, the particular computing device is selected from a plurality of computing devices on which the input publication is to be displayed. The determination that the input publication is unoptimized to be displayed on the particular computing device may include detecting violations of pre-defined optimization rules in code underlying the input publication. The updating of the publication corpus may be based on actuation of a user interface element presented in a preview user interface, the actuation representing an acceptance of one or more automatic fixes to the code. The one or more automatic fixes to the code may be derived from the standardized publication. The content from the standard publication may include a reference to a three-dimensional interactive image selected from a catalog of three-dimensional interactive images based on a correspondence between the three-dimensional interactive image and a product description included in the input publication. The preview may be presented in a user interface that includes a simulation of a display of the input publication on the particular computing device. The simulation may be updated based on actuation of one or more user interface elements included in the user interface to apply or revert automatic fixes to detected violations of rules pertaining to optimal presentation of the input publication on the particular computing device.

FIG. 1 is a block diagram illustrating a networked system, according to some example embodiments. With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), an application 114, and a programmatic client 116 executing on client device 110.

The client device 110 may comprise, but are not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as needed basis, for data or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 216 and a web server 218 are coupled to, and provide programmatic and web interfaces respectively to, one or more application servers 140. The application server 140 host the intelligent personal assistant system 142, which includes the artificial intelligence framework 144, each of which may comprise one or more modules or applications and each of which may be embodied as hardware, software, firmware, or any combination thereof.

The application server 140 is, in turn, shown to be coupled to one or more database servers 226 that facilitate access to one or more information storage repositories or databases 226. In an example embodiment, the databases 226 are storage devices that store information to be posted (e.g., publications or listings) to the publication system 242. The databases 226 may also store digital item information in accordance with example embodiments.

Additionally, a third-party application 132, executing on third-party servers 130, is shown as having programmatic access to the networked system 102 via the programmatic interface provided by the API server 216. For example, the third-party application 132, utilizing information retrieved from the networked system 102, supports one or more features or functions on a website hosted by the third party. The third-party website, for example, provides one or more promotional, marketplace, or payment functions that are supported by the relevant applications of the networked system 102.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 102 and the artificial intelligence framework system 144 could also be implemented as standalone software programs, which do not necessarily have networking capabilities.

The web client 212 may access the intelligent personal assistant system 142 via the web interface supported by the web server 218. Similarly, the programmatic client 116 accesses the various services and functions provided by the intelligent personal assistant system 142 via the programmatic interface provided by the API server 216.

Additionally, a third-party application(s) 132, executing on a third-party server(s) 130, is shown as having programmatic access to the networked system 102 via the programmatic interface provided by the API server 114. For example, the third-party application 132, utilizing information retrieved from the networked system 102, may support one or more features or functions on a website hosted by the third party. The third-party website may, for example, provide one or more promotional, marketplace, or payment functions that are supported by the relevant applications of the networked system 102.

Figure 2:
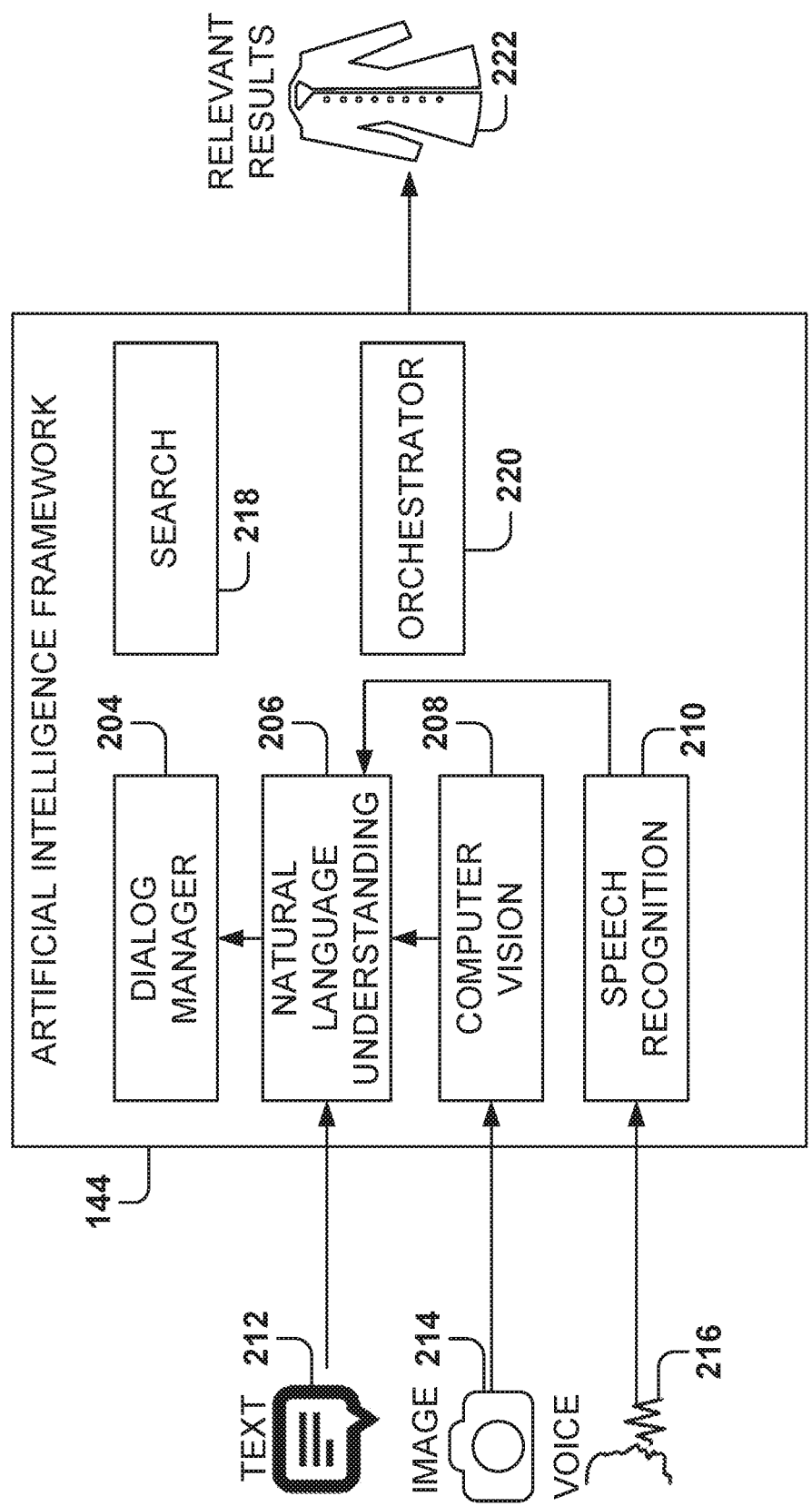
FIG. 2 is a diagram illustrating the operation of the intelligent assistant, according to some example embodiments.

FIG. 2 is a diagram illustrating the operation of the intelligent assistant, according to some example embodiments. Today's online shopping is impersonal, unidirectional, and not conversational. Buyers cannot speak in plain language to convey their wishes, making it difficult to convey intent. Shopping on a commerce site is usually more difficult than speaking with a salesperson or a friend about a product, so oftentimes buyers have trouble finding the products they want.

Embodiments present a personal shopping assistant, also referred to as an intelligent assistant, that supports a two-way communication with the shopper to build context and understand the intent of the shopper, enabling delivery of better, personalized shopping results. The intelligent assistant has a natural, human-like dialog, which helps a buyer with ease, increasing the likelihood that the buyer will reuse the intelligent assistant for future purchases.

The artificial intelligence framework 144 understands the user and the available inventory to respond to natural-language queries and has the ability to deliver an incremental improvements in anticipating and understanding the customer and their needs.

The artificial intelligence framework (AIF) 144 includes a dialogue manager 504, natural language understanding (NLU) 206, computer vision 208, speech recognition 210, search 218, and orchestrator 220. The AIF 144 is able to receive different kinds of inputs, such as text input 212, image input 214 and voice input 216, to generate relevant results 222. As used herein, the AIF 144 includes a plurality of services (e.g., NLU 206, computer vision 208) that are implemented by corresponding servers, and the terms service or server may be utilized to identify the service and the corresponding service.

The natural language understanding (NLU) 206 unit processes natural language text input 212, both formal and informal language, detects the intent of the text, and extracts useful information, such as objects of interest and their attributes. The natural language user input can thus be transformed into a structured query using rich information from additional knowledge to enrich the query even further. This information is then passed on to the dialog manager 504 through the orchestrator 220 for further actions with the user or with the other components in the overall system. The structured and enriched query is also consumed by search 218 for improved matching. The text input may be a query for a product, a refinement to a previous query, or other information to an object of relevance (e.g., shoe size).

The computer vision 208 takes image as an input and performs image recognition to identify the characteristics of the image (e.g., item the user wants to ship), which are then transferred to the NLU 206 for processing. The speech recognition 210 takes speech 216 as an input and performs language recognition to convert speech to text, which is then transferred to the NLU for processing.

The NLU 206 determines the object, the aspects associated with the object, how to create the search interface input, and how to generate the response. For example, the AIF 144 may ask questions to the user to clarify what the user is looking for. This means that the AIF 144 not only generates results, but also may create a series of interactive operations to get to the optimal, or close to optimal, results 222.

For example, in response to the query, "Can you find me a pair of red nike shoes?" the AIF 144 may generate the following parameters: <intent:shopping, statement-type: question, dominant-object: shoes, target:self, color:red, brand:nike>. To the query, "I am looking for a pair of sunglasses for my wife," the NLU may generate <intent: shopping, statement-type: statement, dominant-object:sunglasses, target:wife, target-gender: female>.

The dialogue manager 504 is the module that analyzes the query of a user to extract meaning, and determines if there is a question that needs to be asked in order to refine the query, before sending the query to search 218. The dialogue manager 504 uses the current communication in context of the previous communication between the user and the artificial intelligence framework 144. The questions are automatically generated dependent on the combination of the accumulated knowledge (e.g., provided by a knowledge graph) and what search can extract out of the inventory. The dialogue manager's job is to create a response for the user. For example, if the user says, "hello," the dialogue manager 504 generates a response, "Hi, my name is bot."

The orchestrator 220 coordinates the interactions between the other services within the artificial intelligence framework 144. More details are provided below about the interactions of the orchestrator 220 with other services with reference to FIG. 5.

Figure 3:
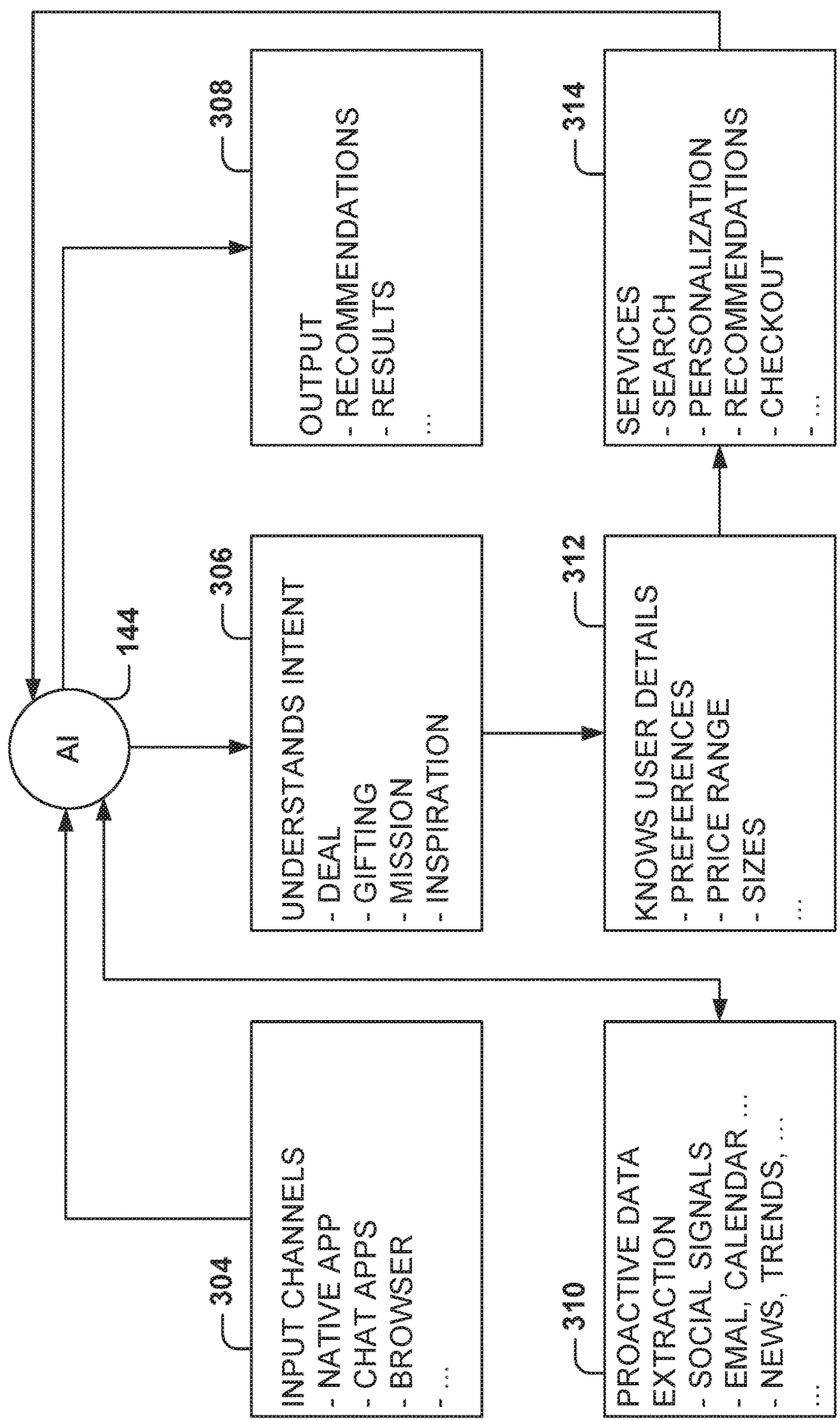
FIG. 3 illustrates the features of the artificial intelligence (AI) framework, according to some example embodiments.

FIG. 3 illustrates the features of the artificial intelligence framework (AIF) 144, according to some example embodiments. The AIF 144 is able to interact with several input channels 304, such as native commerce applications, chat applications, social networks, browsers, etc. In addition, the AIF 144 understands the intent 306 expressed by the user. For example, the intent may include a user looking for a good deal, or a user looking for a gift, or a user on a mission to buy a specific product, a user looking for suggestions, etc.

Further, the AIF 144 performs proactive data extraction 310 from multiple sources, such as social networks, email, calendar, news, market trends, etc. The AIF 144 knows about user details 312, such as user preferences, desired price ranges, sizes, affinities, etc. The AIF 144 facilitates a plurality of services within the service network, such as product search, personalization, recommendations, checkout features, etc. The output 308 may include recommendations, results, etc.

The AIF 144 is an intelligent and friendly system that understands the user's intent (e.g., targeted search, compare, shop, browse), mandatory parameters (e.g., product, product category, item), optional parameters (e.g., aspects of the item, color, size, occasion), as well as implicit information (e.g., geo location, personal preferences, age, gender). The AIF 144 responds with a well-designed response in plain language.

For example, the AIF 144 may process inputs queries, such as: "Hey! Can you help me find a pair of light pink shoes for my girlfriend please? With heels. Up to $200. Thanks;" "I recently searched for a men's leather jacket with a classic James Dean look. Think almost Harrison Ford's in the new Star Wars movie. However, I'm looking for quality in a price range of $200-300. Might not be possible, but I wanted to see!"; or "I'm looking for a black Northface Thermoball jacket."

Instead of a hardcoded system, the AIF 144 provides a configurable, flexible interface with machine learning capabilities for ongoing improvement. The AIF 144 supports a commerce system that provides value (connecting the user to the things that the user wants), intelligence (knowing and learning from the user and the user behavior to recommend the right items), convenience (offering a plurality of user interfaces), easy of-use, and efficiency (saves the user time and money).

Figure 4:
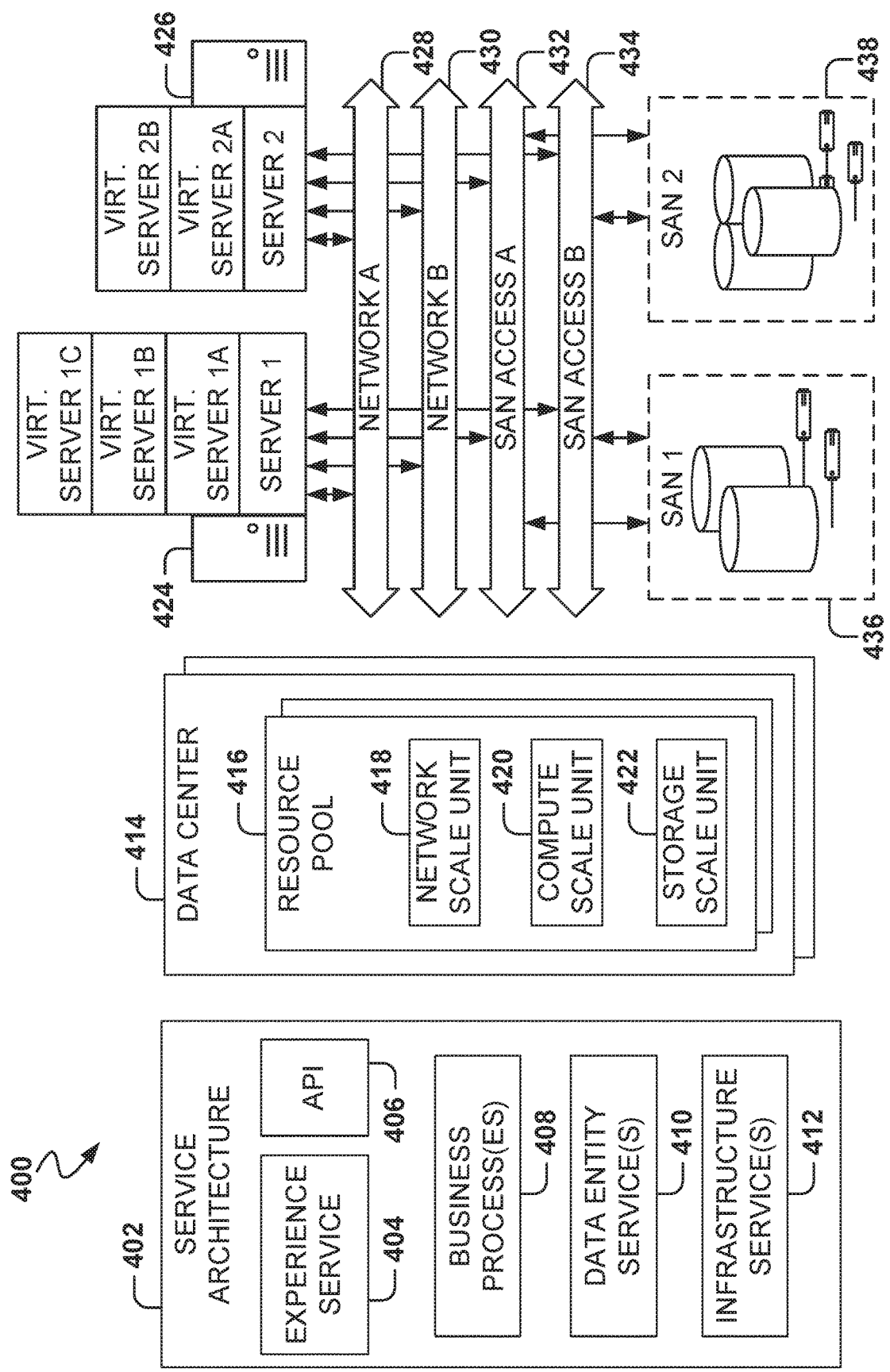
FIG. 4 is a diagram illustrating a service architecture according to some example embodiments.

FIG. 4 is a diagram illustrating a service architecture 400 according to some embodiments. The service architecture 400 presents various views of the service architecture in order to describe how the service architecture may be deployed on various data centers or cloud services. The architecture 400 represents a suitable environment for implementation of the embodiments described herein.

The service architecture 402 represents how a cloud architecture typically appears to a user, developer and so forth. The architecture is generally an abstracted representation of the actual underlying architecture implementation, represented in the other views of FIG. 1. For example, the service architecture 402 comprises a plurality of layers, that represent different functionality and/or services associated with the service architecture 402.

The experience service layer 404 represents a logical grouping of services and features from the end customer's point of view, built across different client platforms, such as applications running on a platform (mobile phone, desktop, etc.), web based presentation (mobile web, desktop web browser, etc.), and so forth. It includes rendering user interfaces and providing information to the client platform so that appropriate user interfaces can be rendered, capturing client input, and so forth. In the context of a marketplace, examples of services that would reside in this layer are home page (e.g., home view), view item listing, search/view search results, shopping cart, buying user interface and related services, selling user interface and related services, after sale experiences (posting a transaction, feedback, etc.), and so forth. In the context of other systems, the experience service layer 404 would incorporate those end user services and experiences that are embodied by the system.

The API layer 406 contains APIs which allow interaction with business process and core layers. This allows third party development against the service architecture 402 and allows third parties to develop additional services on top of the service architecture 402.

The business process service layer 408 is where the business logic resides for the services provided. In the context of a marketplace this is where services such as user registration, user sign in, listing creation and publication, add to shopping cart, place an offer, checkout, send invoice, print labels, ship item, return item, and so forth would be implemented. The business process service layer 408 also orchestrates between various business logic and data entities and thus represents a composition of shared services. The business processes in this layer can also support multi-tenancy in order to increase compatibility with some cloud service architectures.

The data entity service layer 410 enforces isolation around direct data access and contains the services upon which higher level layers depend. Thus, in the marketplace context this layer can comprise underlying services like order management, financial institution management, user account services, and so forth. The services in this layer typically support multi-tenancy.

The infrastructure service layer 412 comprises those services that are not specific to the type of service architecture being implemented. Thus, in the context of a marketplace, the services in this layer are services that are not specific or unique to a marketplace. Thus, functions like cryptographic functions, key management, CAPTCHA, authentication and authorization, configuration management, logging, tracking, documentation and management, and so forth reside in this layer.

Embodiments of the present disclosure will typically be implemented in one or more of these layers. In particular, the AIF 144, as well as the orchestrator 220 and the other services of the AIF 144.

The data center 414 is a representation of the various resource pools 416 along with their constituent scale units. This data center representation illustrates the scaling and elasticity that comes with implementing the service architecture 402 in a cloud computing model. The resource pool 416 is comprised of server (or compute) scale units 420, network scale units 418 and storage scale units 422. A scale unit is a server, network and/or storage unit that is the smallest unit capable of deployment within the data center. The scale units allow for more capacity to be deployed or removed as the need increases or decreases.

The network scale unit 418 contains one or more networks (such as network interface units, etc.) that can be deployed. The networks can include, for example virtual LANs. The compute scale unit 420 typically comprise a unit (server, etc.) that contains a plurality processing units, such as processors. The storage scale unit 422 contains one or more storage devices such as disks, storage attached networks (SAN), network attached storage (NAS) devices, and so forth. These are collectively illustrated as SANs in the description below. Each SAN may comprise one or more volumes, disks, and so forth.

The remaining view of FIG. 1 illustrates another example of a service architecture 400. This view is more hardware focused and illustrates the resources underlying the more logical architecture in the other views of FIG. 1. A cloud computing architecture typically has a plurality of servers or other systems 424, 426. These servers comprise a plurality of real and/or virtual servers. Thus the server 424 comprises server 1 along with virtual servers 1A, 1B, 1C and so forth.

The servers are connected to and/or interconnected by one or more networks such as network A 428 and/or network B 430. The servers are also connected to a plurality of storage devices, such as SAN 1 (436), SAN 2 (438) and so forth. SANs are typically connected to the servers through a network such as SAN access A 432 and/or SAN access B 434.

The compute scale units 420 are typically some aspect of servers 424 and/or 426, like processors and other hardware associated therewith. The network scale units 418 typically include, or at least utilize the illustrated networks A (428) and B (432). The storage scale units typically include some aspect of SAN 1 (436) and/or SAN 2 (438). Thus, the logical service architecture 402 can be mapped to the physical architecture.

Services and other implementation of the embodiments described herein will run on the servers or virtual servers and utilize the various hardware resources to implement the disclosed embodiments.

Figure 5:
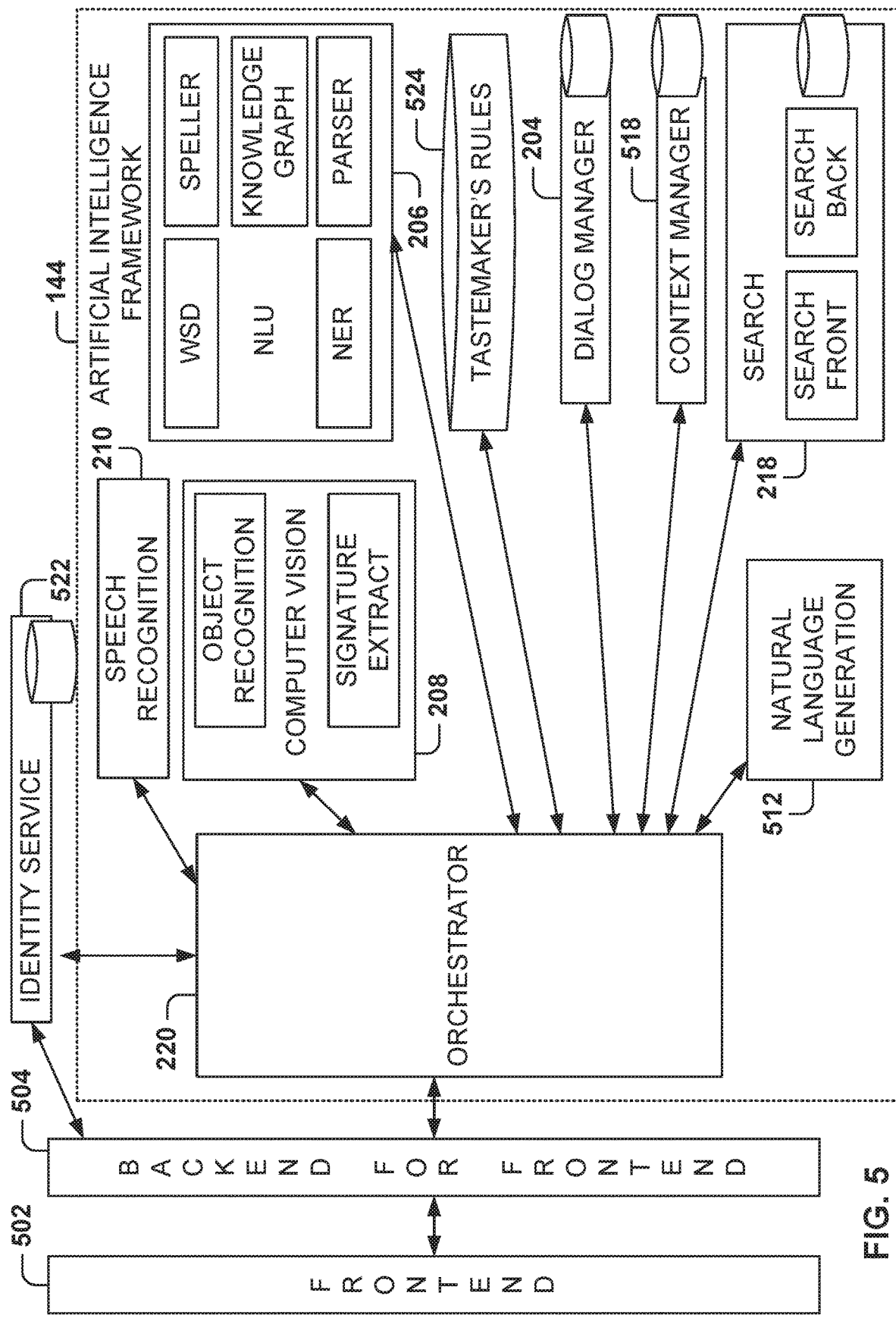
FIG. 5 is a block diagram for implementing the AI framework, according to some example embodiments.

FIG. 5 is a block diagram for implement the AIF 144, according to some example embodiments. Specifically, the intelligent personal assistant system 142 of FIG. 2 is shown to include a front end component 502 (FE) by which the intelligent personal assistant system 142 communicates (e.g., over the network 104) with other systems within the network architecture 100. The front end component 502 can communicate with the fabric of existing messaging systems. As used herein, the term messaging fabric refers to a collection of APIs and services that can power third party platforms such as Facebook messenger, Microsoft Cortana, and others "bots." In one example, a messaging fabric can support an online commerce ecosystem that allows users to interact with commercial intent. Output of the front end component 502 can be rendered in a display of a client device, such as the client device 110 in FIG. 1 as part of an interface with the intelligent personal assistant.

The front end component 502 of the intelligent personal assistant system 142 is coupled to a back end component 504 for the front end (BFF) that operates to link the front end component 502 with the AIF 144. The artificial intelligence framework 144 includes several components discussed below.

In one example embodiment, an orchestrator 220 orchestrates communication of components inside and outside the artificial intelligence framework 144. Input modalities for the AI orchestrator 206 are derived from a computer vision component 208, a speech recognition component 210, and a text normalization component which may form part of the speech recognition component 210. The computer vision component 208 may identify objects and attributes from visual input (e.g., photo). The speech recognition component 210 converts audio signals (e.g., spoken utterances) into text. The text normalization component operates to make input normalization, such as language normalization by rendering emoticons into text, for example. Other normalization is possible such as orthographic normalization, foreign language normalization, conversational text normalization, and so forth.

The artificial intelligence framework 144 further includes a natural language understanding (NLU) component 206 that operates to parse and extract user intent and intent parameters (for example mandatory or optional parameters).

The NLU component 206 is shown to include sub-components such as a spelling corrector (speller), a parser, a named entity recognition (NER) sub-component, a knowledge graph, and a word sense detector (WSD).

The artificial intelligence framework 144 further includes a dialog manager 204 that operates to understand a "completeness of specificity" (for example of an input, such as a search query or utterance) and decide on a next action type and a parameter (e.g., "search" or "request further information from user"). In one example, the dialog manager 204 operates in association with a context manager 518 and a natural language generation (NLG) component 512. The context manager 518 manages the context and communication of a user with respect to online personal assistant (or "bot") and the assistant's associated artificial intelligence. The context manager 518 comprises two parts: long term history and short term memory. Data entries into one or both of these parts can include the relevant intent and all parameters and all related results of a given input, bot interaction, or turn of communication, for example. The NLG component 512 operates to compose a natural language utterance out of a AI message to present to a user interacting with the intelligent bot.

A search component 218 is also included within the artificial intelligence framework 144. As shown, the search component 218 has a front-end and a back-end unit. The back-end unit operates to manage item and product inventory and provide functions of searching against the inventory, optimizing towards a specific tuple of intent and intent parameters. An identity service 522 component, that may or may not form part of artificial intelligence framework 144, operates to manage user profiles, for example explicit information in the form of user attributes (e.g., "name," "age," "gender," "geolocation"), but also implicit information in forms such as "information distillates" such as "user interest," or ""similar persona," and so forth. The identity service 522 includes a set of policies, APIs, and services that elegantly centralizes all user information, enabling the AIF 144 to have insights into the users' wishes. Further, the identity service 522 protects the commerce system and its users from fraud or malicious use of private information.

The functionalities of the artificial intelligence framework 144 can be set into multiple parts, for example decision-making and context parts. In one example, the decision-making part includes operations by the orchestrator 220, the NLU component 206 and its subcomponents, the dialog manager 204, the NLG component 512, the computer vision component 208 and speech recognition component 210. The context part of the AI functionality relates to the parameters (implicit and explicit) around a user and the communicated intent (for example, towards a given inventory, or otherwise). In order to measure and improve AI quality over time, in some example embodiments, the artificial intelligence framework 144 is trained using sample queries (e.g., a development set) and tested on a different set of queries (e.g., an [0001] evaluation set), both sets to be developed by human curation or from use data. Also, the artificial intelligence framework 144 is to be trained on transaction and interaction flows defined by experienced curation specialists, or human override 524. The flows and the logic encoded within the various components of the artificial intelligence framework 144 define what follow-up utterance or presentation (e.g., question, result set) is made by the intelligent assistant based on an identified user intent.

The intelligent personal assistant system 142 seeks to understand a user's intent (e.g., targeted search, compare, shop, browse, and so forth), mandatory parameters (e.g., product, product category, item, and so forth), and optional parameters (e.g., explicit information, e.g., aspects of item/product, occasion, and so forth), as well as implicit information (e.g., geolocation, personal preferences, age and gender, and so forth) and respond to the user with a content-rich and intelligent response. Explicit input modalities can include text, speech, and visual input and can be enriched with implicit knowledge of user (e.g., geolocation, gender, birthplace, previous browse history, and so forth). Output modalities can include text (such as speech, or natural language sentences, or product-relevant information, and images on the screen of a smart device e.g., client device 110. Input modalities thus refer to the different ways users can communicate with the bot. Input modalities can also include keyboard or mouse navigation, touch-sensitive gestures, and so forth.

In relation to a modality for the computer vision component 208, a photograph can often represent what a user is looking for better than text. Also, the computer vision component 208 may be used to form shipping parameters based on the image of the item to be shipped. The user may not know what an item is called, or it may be hard or even impossible to use text for fine detailed information that an expert may know, for example a complicated pattern in apparel or a certain style in furniture. Moreover, it is inconvenient to type complex text queries on mobile phones and long text queries typically have poor recall. Key functionalities of the computer vision component 208 include object localization, object recognition, optical character recognition (OCR) and matching against inventory based on visual cues from an image or video. A bot enabled with computer vision is advantageous when running on a mobile device which has a built-in camera. Powerful deep neural networks can be used to enable computer vision applications.

With reference to the speech recognition component 210, a feature extraction component operates to convert raw audio waveform to some-dimensional vector of numbers that represents the sound. This component uses deep learning to project the raw signal into a high-dimensional semantic space. An acoustic model component operates to host a statistical model of speech units, such as phonemes and allophones. These can include Gaussian Mixture Models (GMM) although the use of Deep Neural Networks is possible. A language model component uses statistical models of grammar to define how words are put together in a sentence. Such models can include n-gram-based models or Deep Neural Networks built on top of word embeddings. A speech-to-text (STT) decoder component converts a speech utterance into a sequence of words typically leveraging features derived from a raw signal using the feature extraction component, the acoustic model component, and the language model component in a Hidden Markov Model (HMM) framework to derive word sequences from feature sequences. In one example, a speech-to-text service in the cloud has these components deployed in a cloud framework with an API that allows audio samples to be posted for speech utterances and to retrieve the corresponding word sequence. Control parameters are available to customize or influence the speech-to-text process.

Machine-learning algorithms may be used for matching, relevance, and final re-ranking by the AIF 144 services. Machine learning is a field of study that gives computers the ability to learn without being explicitly programmed. Machine learning explores the study and construction of algorithms that can learn from and make predictions on data. Such machine-learning algorithms operate by building a model from example inputs in order to make data-driven predictions or decisions expressed as outputs. Machine-learning algorithms may also be used to teach how to implement a process.

Deep learning models, deep neural network (DNN), recurrent neural network (RNN), convolutional neural network (CNN), and long short-term CNN, as well as other ML models and IR models may be used. For example, search 218 may use n-gram, entity, and semantic vector-based query to product matching. Deep-learned semantic vectors give the ability to match products to non-text inputs directly. Multi-leveled relevance filtration may use BM25, predicted query leaf category+product leaf category, semantic vector similarity between query and product, and other models, to pick the top candidate products for the final re-ranking algorithm.

Predicted click-through-rate and conversion rate, as well as GMV, constitutes the final re-ranking formula to tweak functionality towards specific business goals, more shopping engagement, more products purchased, or more GMV. Both the click prediction and conversion prediction models take in query, user, seller and product as input signals. User profiles are enriched by learning from onboarding, side-boarding, and user behaviors to enhance the precision of the models used by each of the matching, relevance, and ranking stages for individual users. To increase the velocity of model improvement, offline evaluation pipeline is used before online A/B testing.

In one example of an artificial intelligence framework 144, two additional parts for the speech recognition component 210 are provided, a speaker adaptation component and an LM adaptation component. The speaker adaptation component allows clients of an STT system (e.g., speech recognition component 210) to customize the feature extraction component and the acoustic model component for each speaker. This can be important because most speech-to-text systems are trained on data from a representative set of speakers from a target region and typically the accuracy of the system depends heavily on how well the target speaker matches the speakers in the training pool. The speaker adaptation component allows the speech recognition component 210 (and consequently the artificial intelligence framework 144) to be robust to speaker variations by continuously learning the idiosyncrasies of a user's intonation, pronunciation, accent, and other speech factors and apply these to the speech-dependent components, e.g., the feature extraction component, and the acoustic model component. While this approach utilizes a non-significant-sized voice profile to be created and persisted for each speaker, the potential benefits of accuracy generally far outweigh the storage drawbacks.

The language model (LM) adaptation component operates to customize the language model component and the speech-to-text vocabulary with new words and representative sentences from a target domain, for example, inventory categories or user personas. This capability allows the artificial intelligence framework 144 to be scalable as new categories and personas are supported.

The AIF's goal is to provide a scalable and expandable framework for AI, one in which new activities, also referred to herein as missions, can be accomplished dynamically using the services that perform specific natural-language processing functions. Adding a new service does not require to redesign the complete system. Instead, the services are prepared (e.g., using machine-learning algorithms) if necessary, and the orchestrator is configured with a new sequence related to the new activity.

Embodiments presented herein provide for dynamic configuration of the orchestrator 220 to learn new intents and how to respond to the new intents. In some example embodiments, the orchestrator 220 "learns" new skills by receiving a configuration for a new sequence associated with the new activity. The sequence specification includes a sequence of interactions between the orchestrator 220 and a set of one or more service servers from the AIF 144. In some example embodiments, each interaction of the sequence includes (at least): identification for a service server, a call parameter definition to be passed with a call to the identified service server; and a response parameter definition to be returned by the identified service server.

In some example embodiments, the services within the AIF 144, except for the orchestrator 220, are not aware of each other, e.g., they do not interact directly with each other. The orchestrator 220 manages all the interactions with the other servers. Having the central coordinating resource simplifies the implementation of the other services, which need not be aware of the interfaces (e.g., APIs) provided by the other services. Of course, there can be some cases where a direct interface may be supported between pairs of services.

Some embodiments relate to optimizing, transforming, and augmenting an e-commerce marketplace seller provided product listing description with unstructured and structured data for various computing devices with human to computer interaction capabilities (e.g. VR/AR headset, smart phone, unified Chat user interface, smart digital goggle, tablet, digital TV, car digital dashboard) to dramatically increase buyer engagement and conversion.

Each of the compute devices is of different form factor, human interaction pattern and e-commerce content consumption patterns & habits, as e-commerce expands from to the new and future emerging computing devices, each computing device would require the seller provided production description (which includes textual description, images, 3-D images, VR 3D geometric models, video etc.) to be transformed, augmented and optimized to fit into a specific computing form factor optimally to drive buyer engagement, interaction and conversion. To help seller tackle this multi-channel e-commerce challenge, we propose a general algorithm driven method and system to score, transform, preview, augment and optimize seller provided production description for multiple target computing devices in easy-of-use and interactive way in for e-commerce marketplace.

In other embodiments, the same method is:
1) Applicable to digital content publishing, and/or
2) Able to transform existing e-commerce product/publication catalog automatically for list of existing and future computing devices (e.g. VR Product Catalogue).

Figure 6:
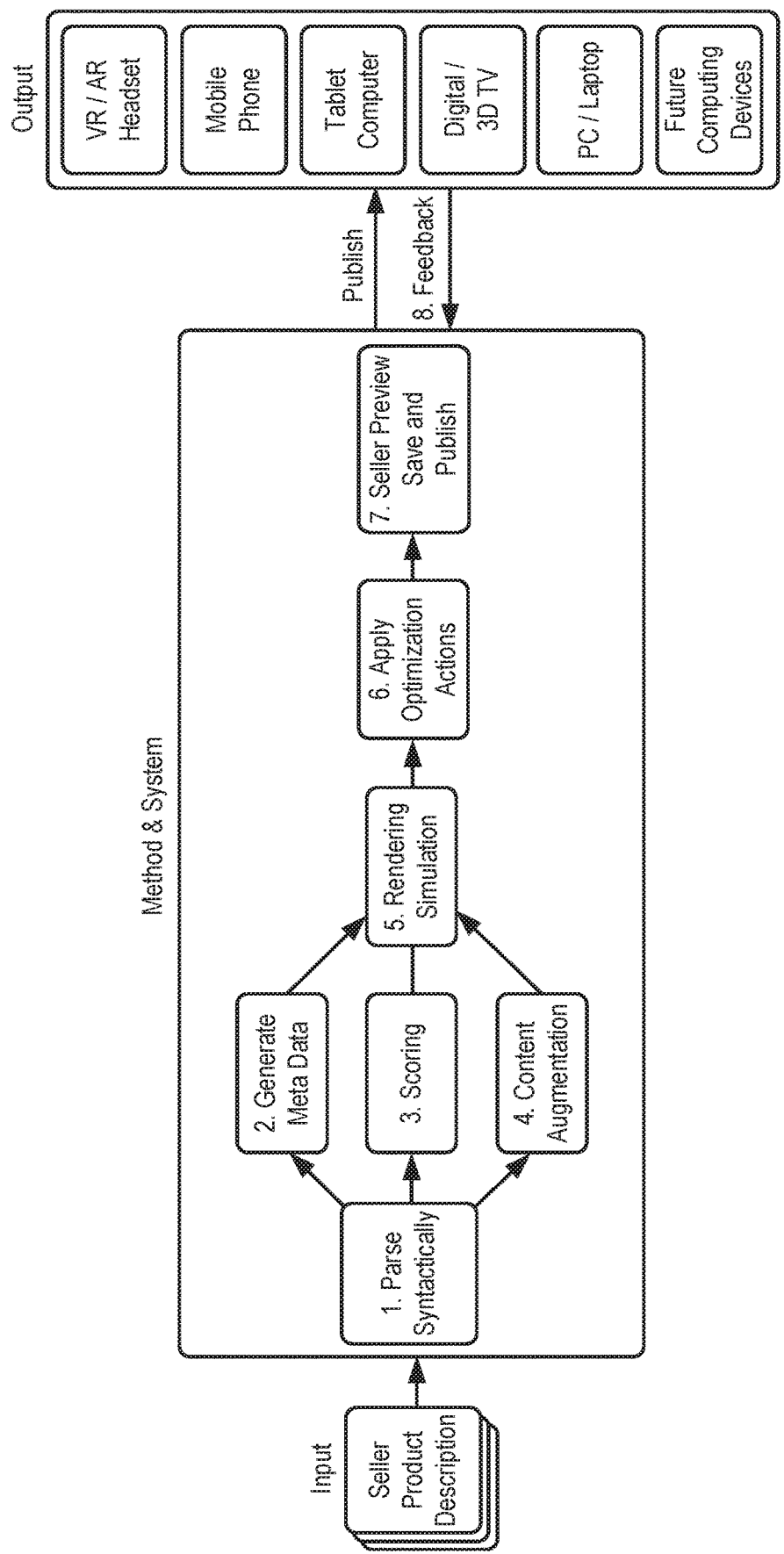
FIG. 6 is an example process flow of augmenting a seller provided description.

Some embodiments take a seller provided product description (which may include unstructured textual description, images, 3-D images, VR 3D geometric models, video etc.) with various quality, and process the description as in FIG. 6, which shows the following:

1. Parse the product description syntactically to understand the description structure (e.g. content layout, content type vs. content value) to make a parse tree, leverage text structure, understand layout, and content meaning by leveraging NLP (natural language processing) and text analytics technologies to understand the product.

2. Generate the meta data for the same description by grouping content based on content type, e.g. images groups, videos group, textual description group, VR 3D geometric model groups etc.) for future content transformation.

3. For a particular target computing device, score the quality of given product description based on structure and meaning against both pre-defined set of rules and machine learned classifier (e.g., based on 1).

4. If a standard catalogue product can be identified with high confidence using machine learned content similarity scoring algorithm, image and video object recognition technologies, then the standard catalogue product content is leveraged to augment the seller provided product description for a particular computing device (e.g., based on 1, 2, and 3). This augmentation may include, for example, using HTML code of underlying product descriptions that are optimized for the particular targeting computing device to optimize underlying code of a product description or incorporating references to interactive three-dimensional images included in the standard catalogue product into the product description.

5. Render optimally seller provided product description and potential augmented catalogue product information in a simulated environment (e.g. simulated mobile device, simulated VR environment—such as an augmented environment such as a kitchen or desk) for a particular computing device (e.g., a VR headset) with specific content style guide, device form factor, user interaction patterns, so seller would be able to preview the product description in that particular simulated device, even prior to creation of a product (e.g., based on 2).

6. Provide a list of content optimization actions (based on the pre-defined rules for the target computing device) for the seller to remove content, apply to layout optimization, user interaction optimization, remove certain type of content for rendering performance reasons, update content with suggested data points like brand, model, accept augmented data from high quality product catalogue (e.g. VR 3D geometric models which supports user gesture control) the content optimization for a particular computing device in easy-of-use and interactive way (e.g., based on 5). The content for different devices can be generated on the fly, or pre-generated in advance of publication. The 3D model is generated based on a 2D product description, such as for 3D TV or VR to allow seller interaction in the preview. Output for each device type is created in advance or at runtime. Thus, for example, upon acceptance of one or more automatic fixes to rule violations of underlying code corresponding to a product description, the fixes may be reflected (e.g., in real time) in a simulation of a presentation of a product listing on a target computing device.

7. Seller is able preview the optimized content in the simulated computing environment rendered for a particular computing device and accept the changes suggested, save and publish the transformed, augmented and optimized content to various computing devices to drive e-commerce buyer engagement, browsing and conversion. The user only needs to create one listing, and then the one listing is propagated to various types of computing devices.

8. The Buyer interaction & behavioral data with the product, conversion and transactional data can be feedback back to 2 to 6 steps of the method to optimize rules to classify or transform the content for different user devices/machine learning algorithms/suggested actions.

Example technology used in some embodiments includes one or more of:

1. Web technology & Web 3D rendering technology (e.g., WebGL)

2. Rule based software system with predefined config specific to various user devices, such as form factor, optimal rendering size and resolution.

3. Computing rendering simulation for VR environment.

4. Parsing, NLP and text analytics for structure and meaning of content.

5. Machine learning (content classifier in terms of quality, scoring, content similarity)

6. Database technology storing, saving augmented product description.

One example takes a PC-centric product description and optimizes for a mobile device. Seller-provided content is rendered for a mobile device and guidance is provide to user for a mobile device. Then the optimized version is rendered for user approval and the optimized version is published for other mobile devices.

Figure 7:
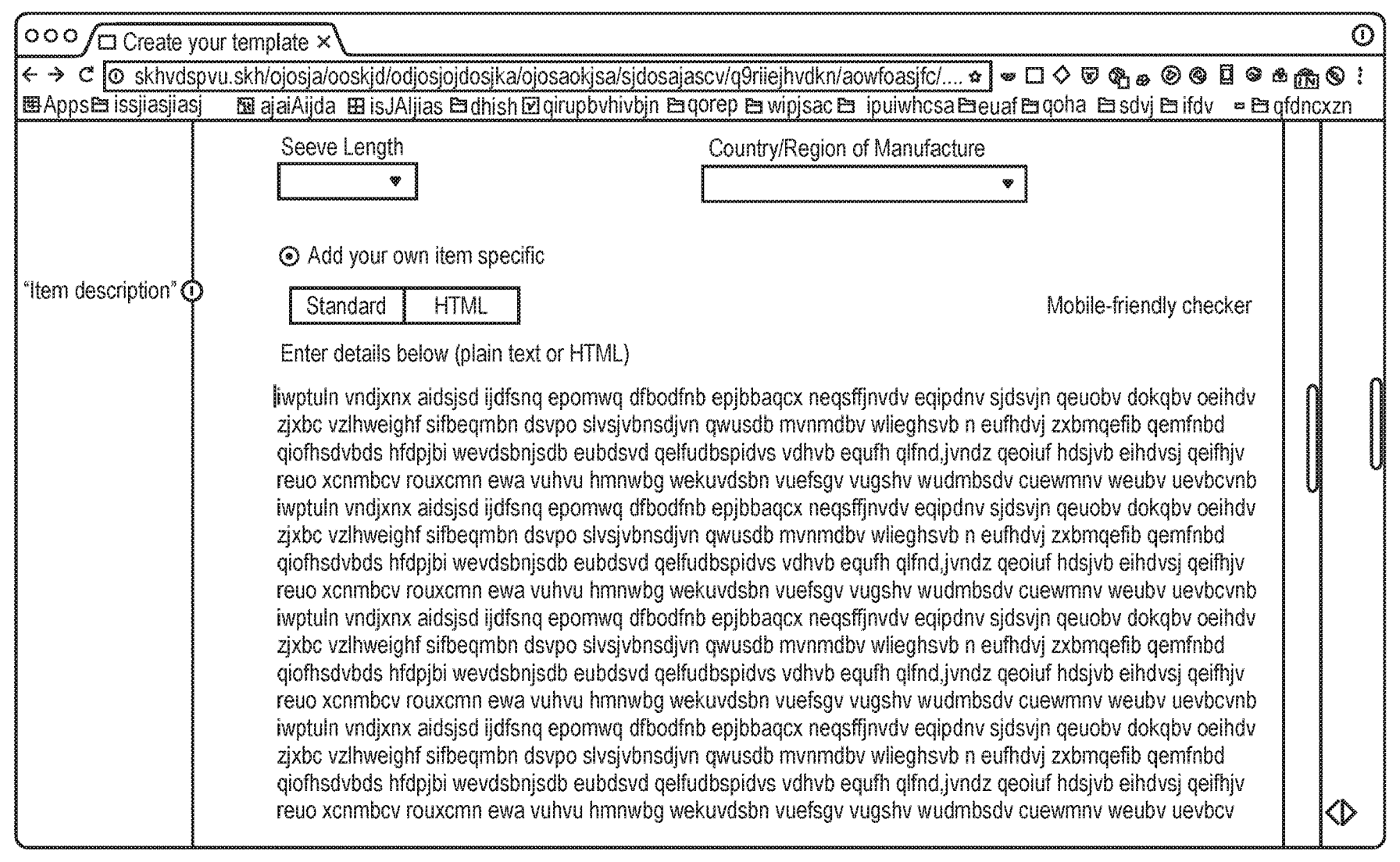

FIG. 7 is an example of a seller-provided product description. In example embodiments, the product description may be specified using plain text or HTML, as shown.

Figure 8:
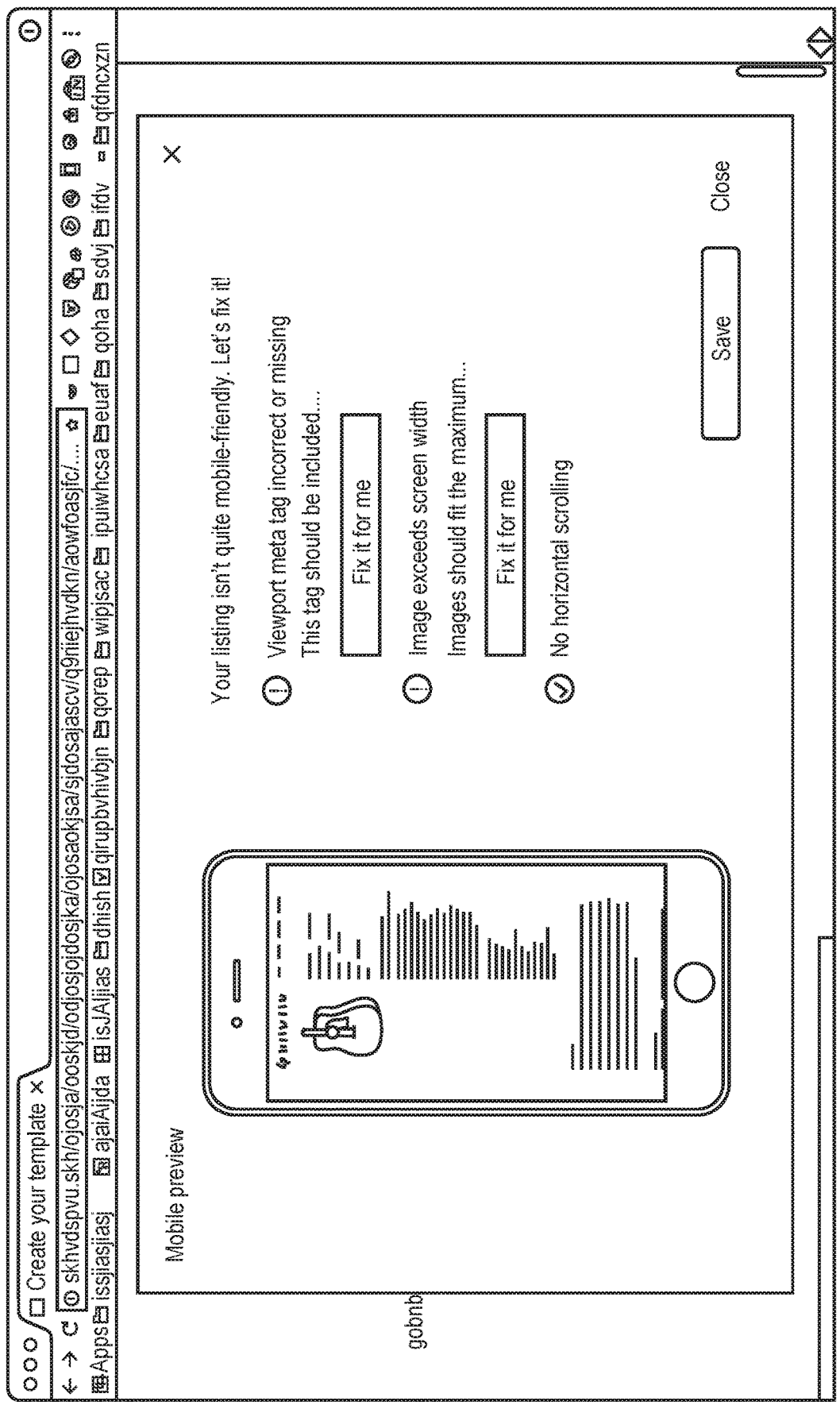
FIG. 8 is an example showing a rendering in a simulated mobile device.

FIG. 8 is an example showing the result of parsing, generating metadata, and rendering in simulated mobile devices and provide list of rule based optimization actions. A preview user interface is displayed on a device of the user. The preview user interface includes a simulation of a presentation of a product listing, including the product description, on a particular computing device (e.g., an iPhone 4) (e.g., as selected pursuant to step 3). Additionally, the mobile preview screen includes a list of rule violations as well as suggested actions for fixing the rule violations (e.g., pursuant to step 6). In example embodiments, the list of rule violations includes short descriptions (e.g., "Viewport meta tag incorrect or missing" or "Image exceeds screen width") as well as longer descriptions (e.g., "This tag should be included in the header for the font size in your item description to be legible on a mobile device" or "Images should fit the maximum width of the screen to prevent horizontal scrolling"). A longer description may be a summary that is expandable into a full description based on an activation of a user interface element ("see more") associated with the longer description. In example embodiments, a user interface element is provided to allow an automatic fix of the rule violation to be performed (e.g., "Fix it for me"). Upon the automatic fix being applied, the rule violation may be replaced in the user interface with an indicator (e.g., a check mark) showing that the violation has been fixed and the title of the rule violation may be changed to reflect the fix (e.g., "No horizontal scrolling.")

Figure 9:
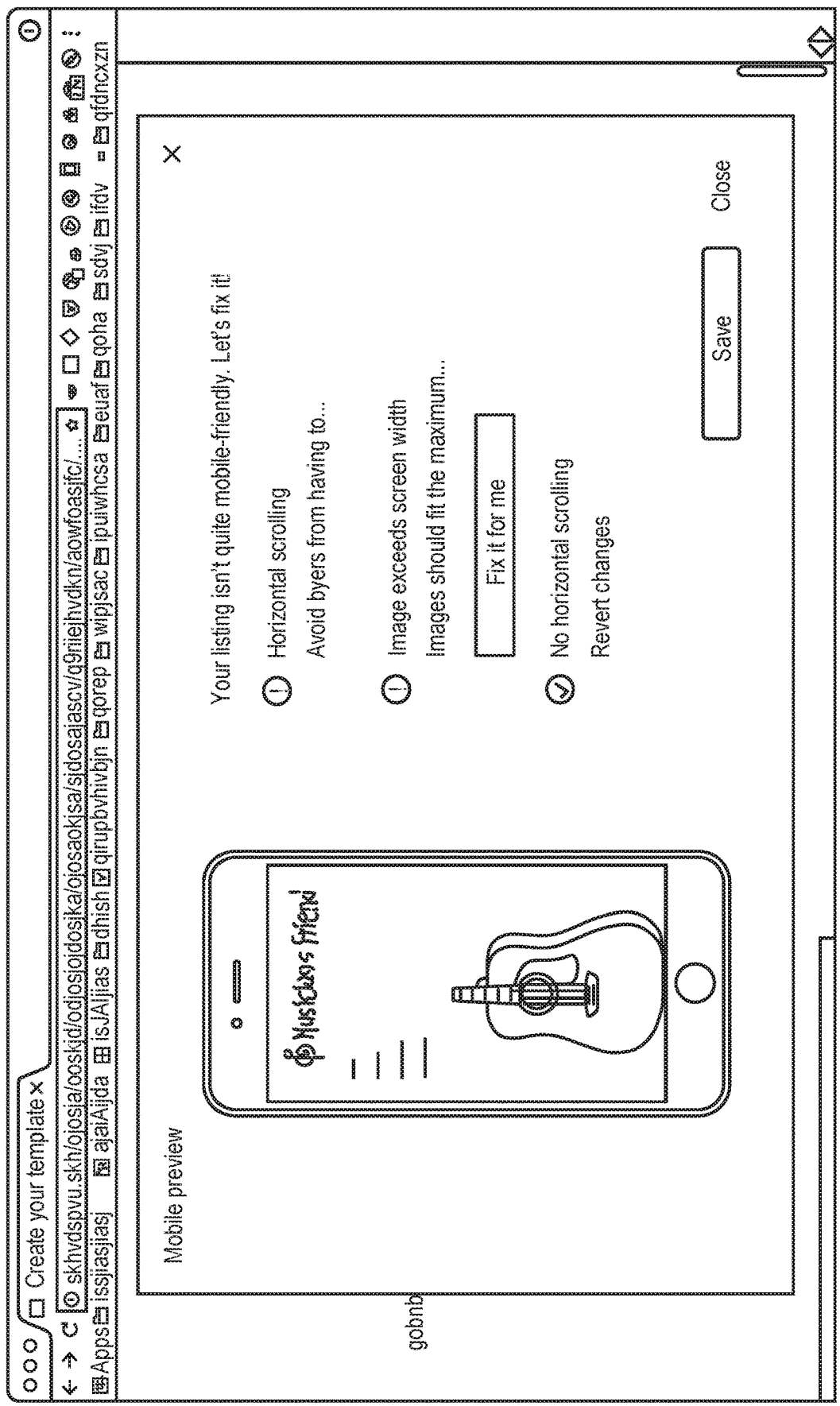
FIG. 9 is an example of applying the optimization actions and rendering the content in simulated mobile environment.

FIG. 9 is an example of a seller applying the optimization actions, rendering the content in simulated mobile environment. In example embodiments, some identified rule violations may not be fixable automatically (e.g., "Horizontal scrolling") and thus corresponding user interface element for automatically fixing the violation will be provided. In these cases, the user may need to edit the HTML coding manually. In example embodiments, upon clicking a user interface element to fix a rule violation automatically (e.g., "Viewport meta tag correctly set."), a user interface element may be provided to revert the changes "e.g., "Revert changes"). In example embodiments, the simulation is updated automatically upon each action being applied or reverted. In example embodiments, the changes may not be saved until the user activates a user interface element (e.g., a "Save" button) to save the changes.

Figure 10:
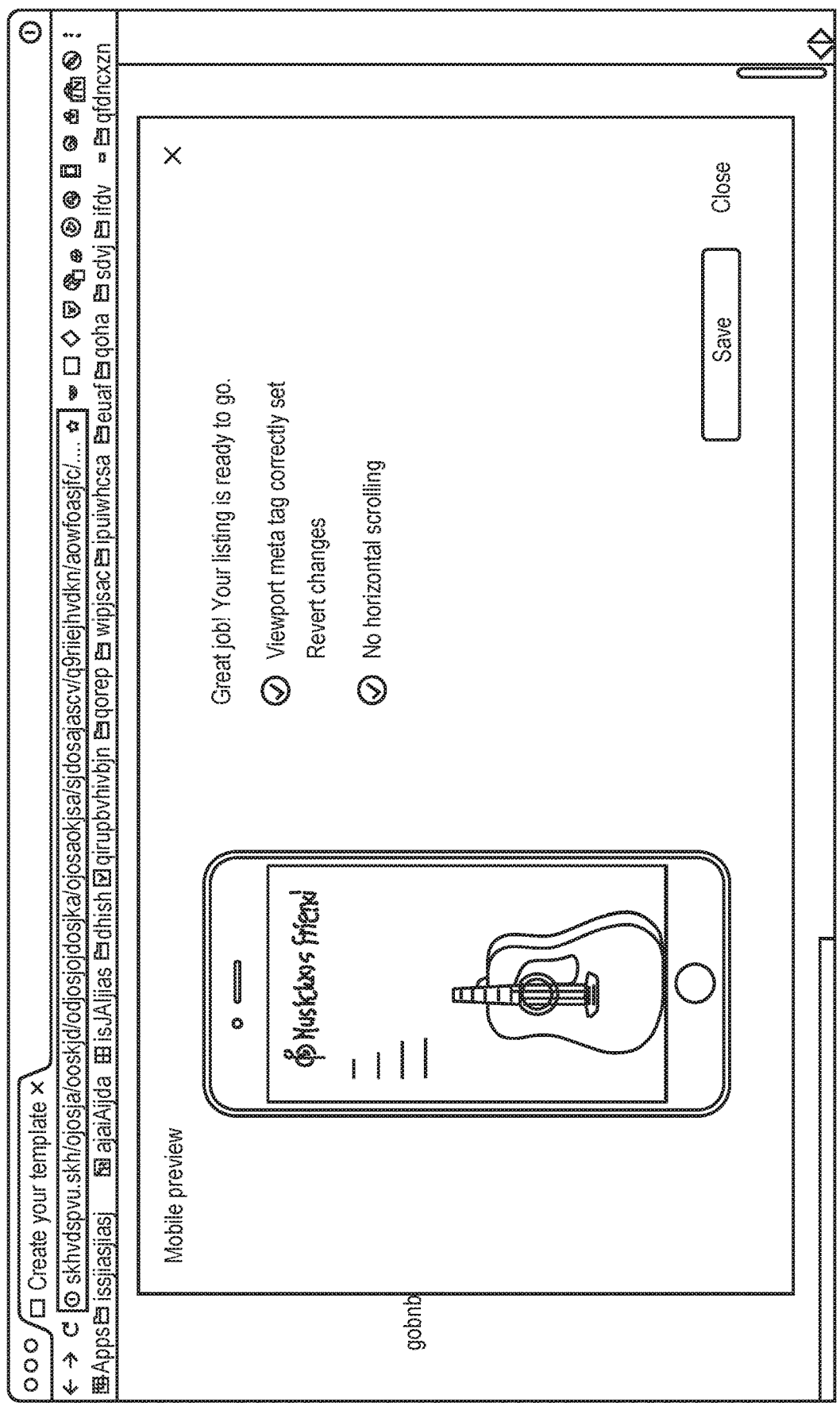
FIG. 10 is an example of a seller applying more optimization actions and rendering the content real time.

FIG. 10 is an example of a seller applying more optimization actions and rendering the content real time. In example embodiments, upon all of the identified rule violations being fixed, a heading on the mobile preview user interface may be updated to indicate that the listing is optimized for the selected device (e.g., "Great job! Your listing is ready to go.").

Figure 11:
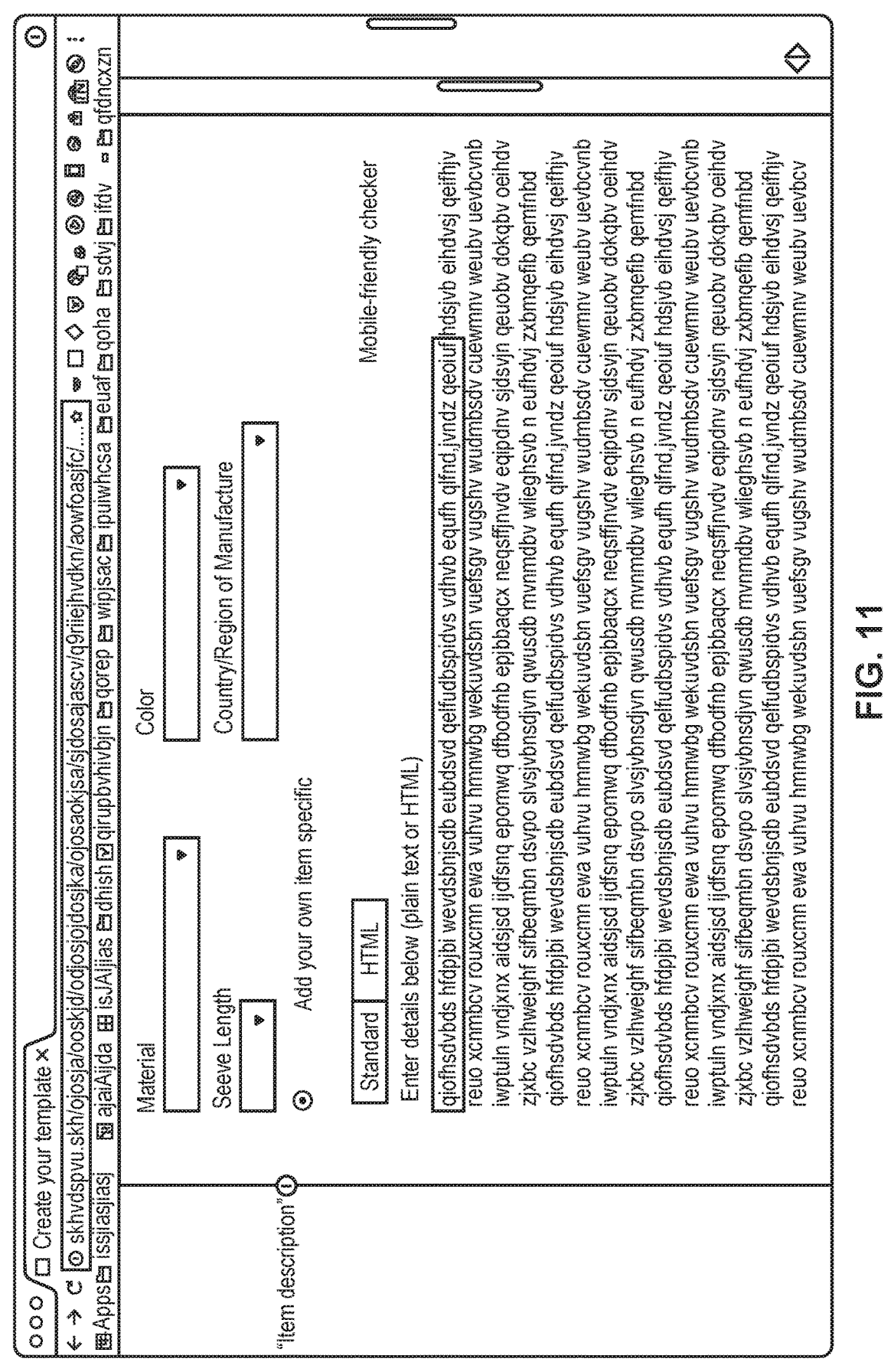

FIG. 11 is an example of a seller saving the optimized content, and the system adding optimization code into the seller provided product description. In example embodiments, upon closing the preview user interface, the user may be presented with the HTML code of the updated product description. In example embodiments, the modified HTML code corresponding to fixes to rule violations may be highlighted, as shown.

Figure 12:
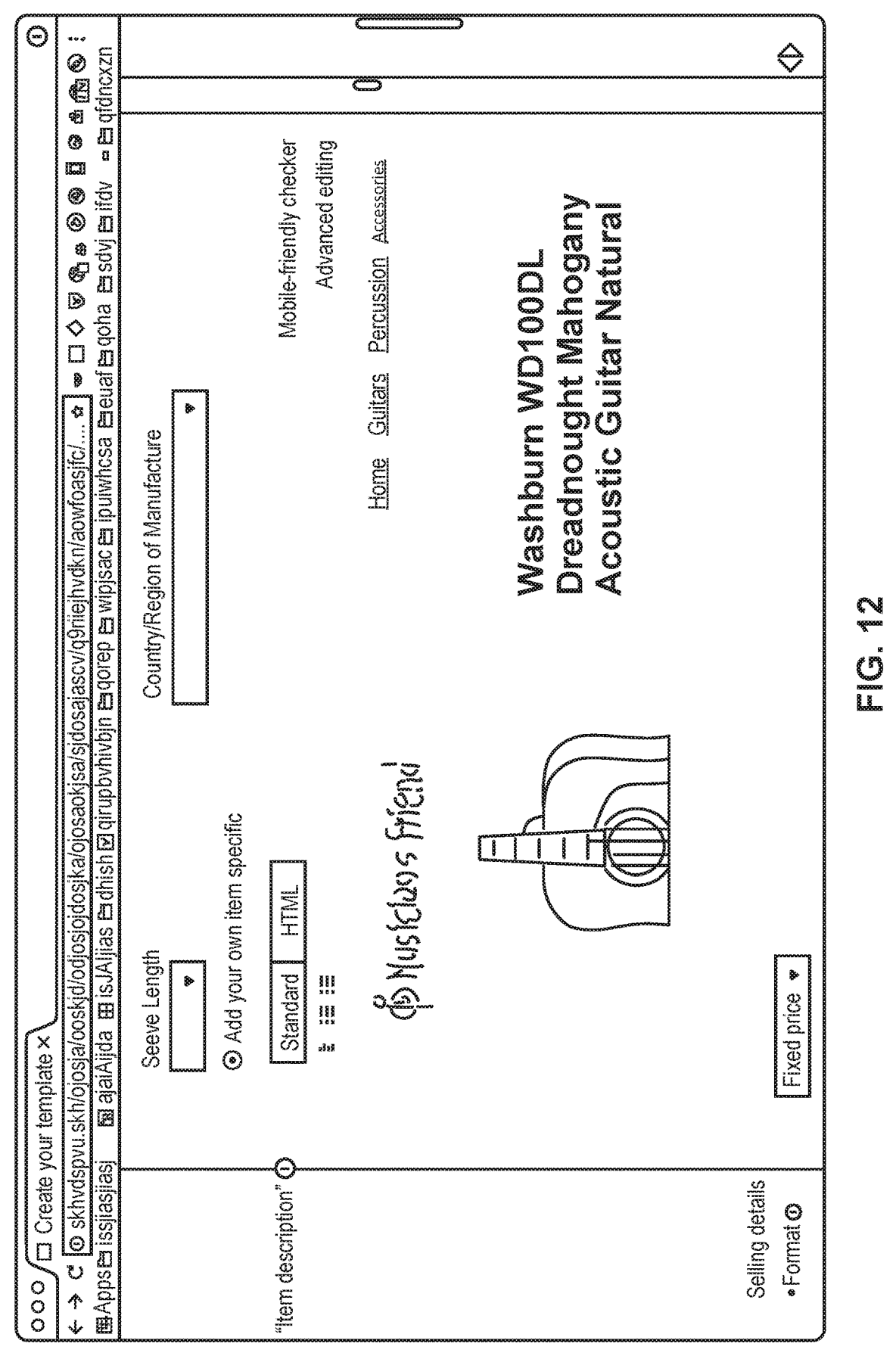

FIG. 12 is an example of a desktop browser rendered seller product description. In example embodiments, a user interface elements (e.g., a tab interface having "Standard" and "HTML" tabs) may allow the user to toggle between standard (e.g., desktop-rendered) and code (e.g., HTML) views of the product description. Here, the standard view is distinguished from the device-specific view that is accessible separately (e.g., via a user interface element on the item listing page, such as "Advanced editing").

Figure 13:
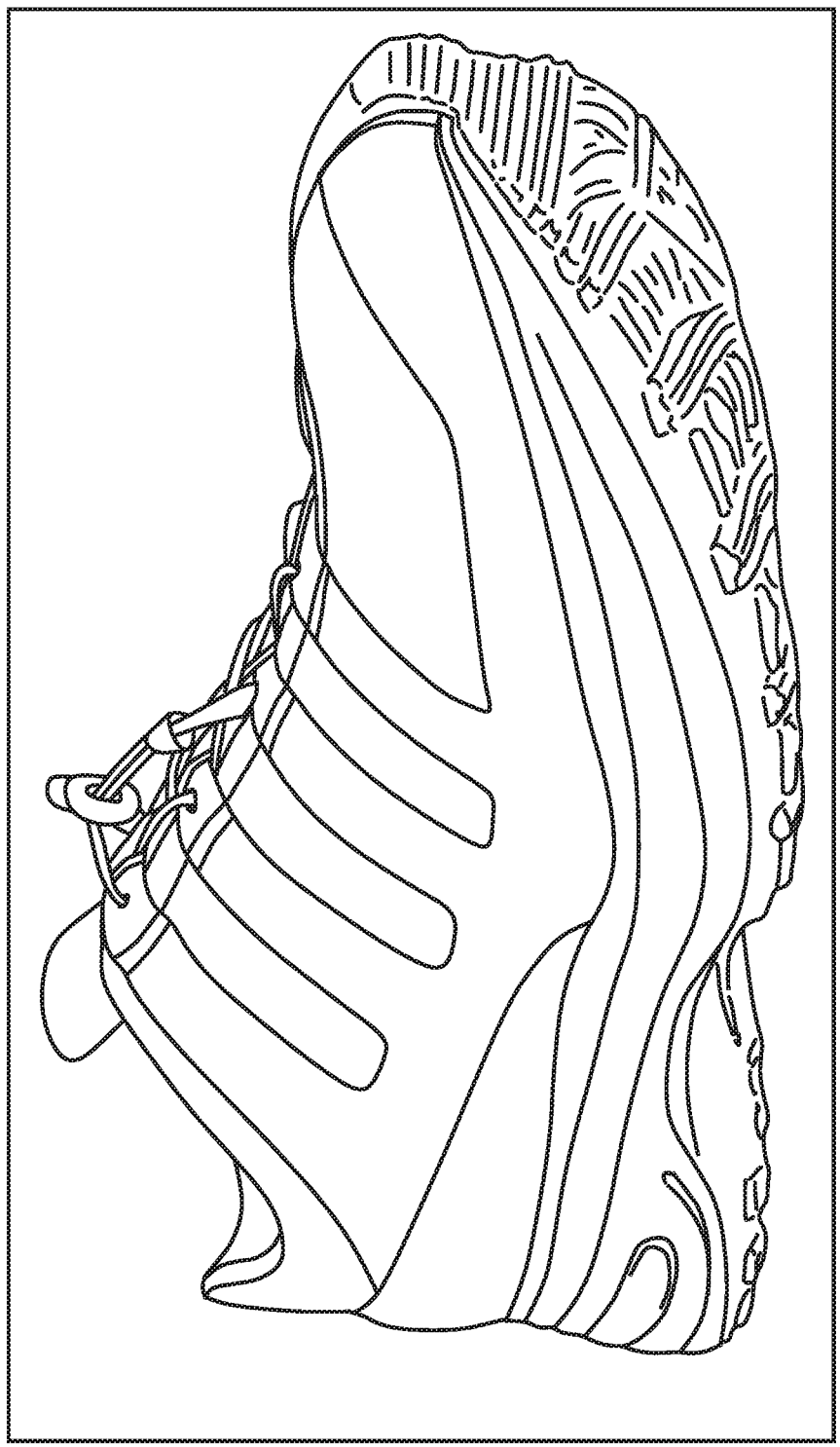
FIGS. 13-14 are examples of augmenting a seller product description with 3-D product catalogue geometric model for 3D computing device so user can interact.
Figure 14:
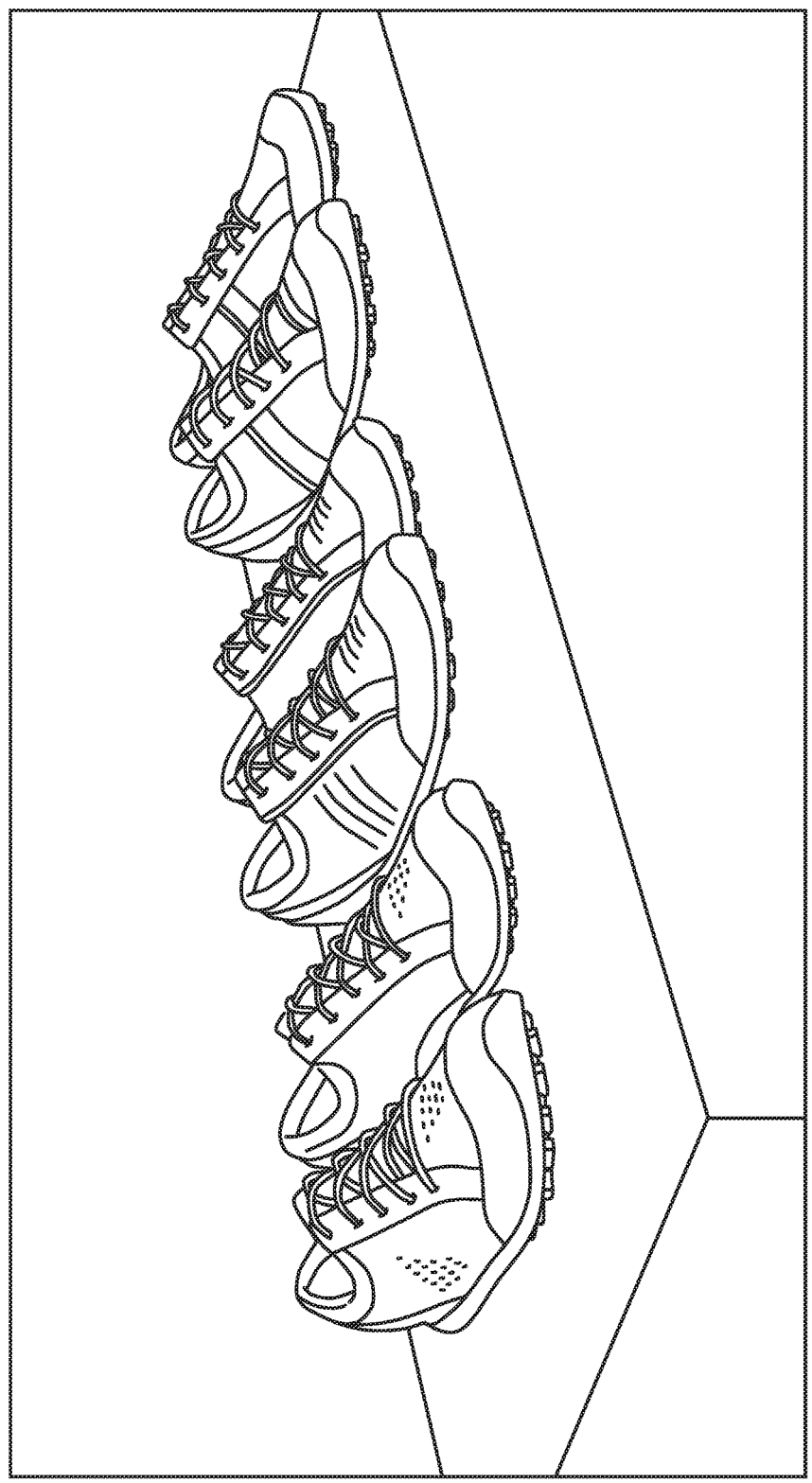

FIGS. 13-14 are examples of augmenting a seller product description with 3-D product catalogue geometric model for 3D computing device so user can interact. In example embodiments, upon identification of a 3D image corresponding to a product listing, a seller may be provided with an option to update the product description to include a reference to the 3D image. Then, upon accessing the product listing, a potential buyer will be able to interact with the 3D image instead of or in addition to any 2D images included in the product listing.

Figure 15:
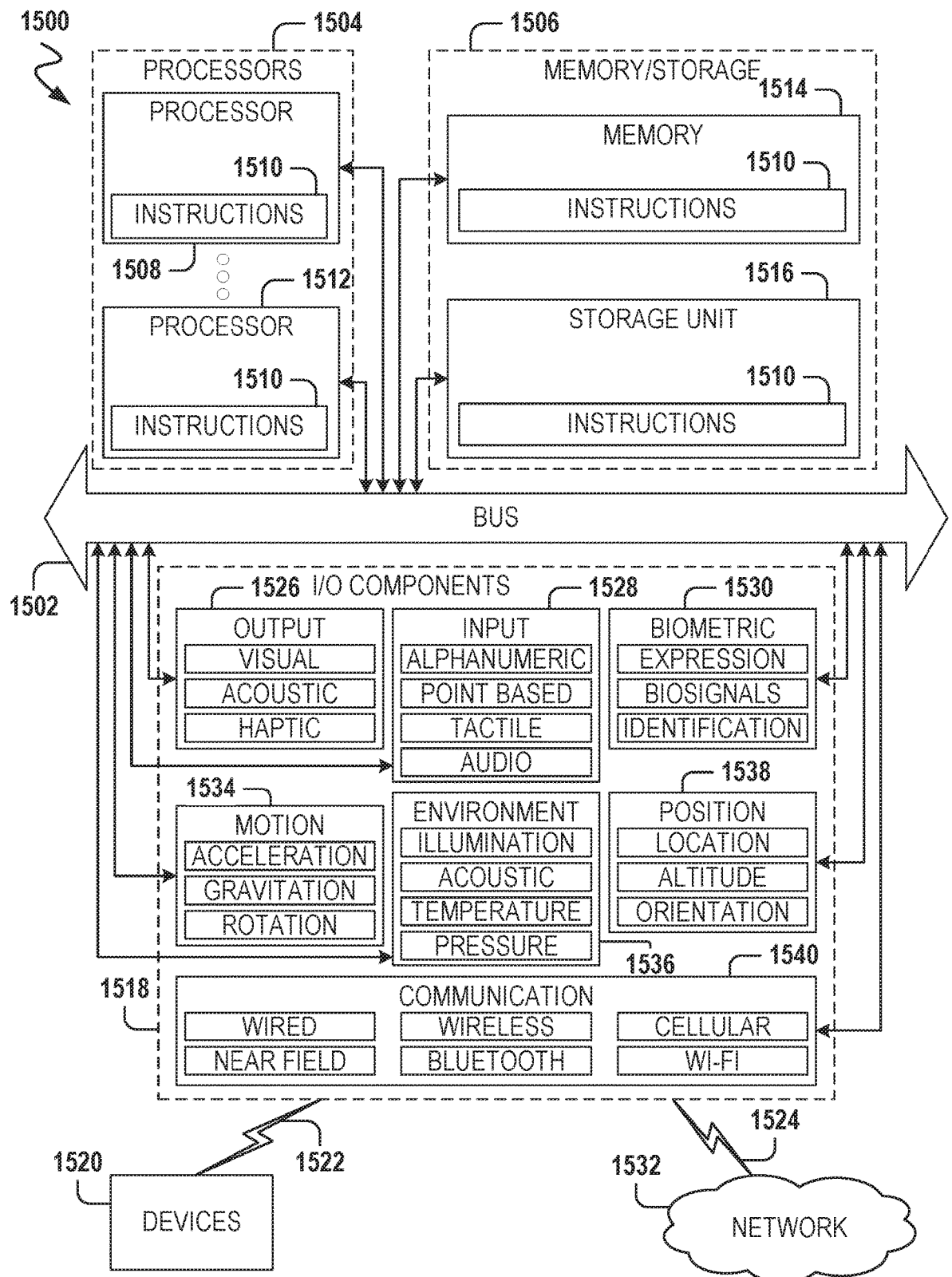
FIG. 15 is a block diagram illustrating an example of a software architecture that may be installed on a machine, according to some example embodiments.

FIG. 15 is a block diagram illustrating components of a machine 1500, according to some example embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1510 (e.g., software, a program, an application, an applet, an app, or other executable code) for causing the machine 1500 to perform any one or more of the methodologies discussed herein may be executed. For example, the instructions 1510 may cause the machine 1500 to execute the flow diagrams of the FIGS. Additionally, or alternatively, the instructions 1510 may implement the servers associated with the services and components of FIGS. 1-14, and so forth. The instructions 1510 transform the general, non-programmed machine 1500 into a particular machine 1500 programmed to carry out the described and illustrated functions in the manner described.

In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a switch, a controller, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1510, sequentially or otherwise, that specify actions to be taken by the machine 1500. Further, while only a single machine 1500 is illustrated, the term "machine" shall also be taken to include a collection of machines 1500 that individually or jointly execute the instructions 1510 to perform any one or more of the methodologies discussed herein.

The machine 1500 may include processors 1504, memory/storage 1506, and I/O components 1518, which may be configured to communicate with each other such as via a bus 1502. In an example embodiment, the processors 1504 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1508 and a processor 1512 that may execute the instructions 1510. The term "processor" is intended to include multi-core processors that may comprise two or more independent processors (sometimes referred to as "cores") that may execute instructions contemporaneously. Although FIG. 15 shows multiple processors 1504, the machine 1500 may include a single processor with a single core, a single processor with multiple cores (e.g., a multi-core processor), multiple processors with a single core, multiple processors with multiples cores, or any combination thereof.

The memory/storage 1506 may include a memory 1514, such as a main memory, or other memory storage, and a storage unit 1516, both accessible to the processors 1504 such as via the bus 1502. The storage unit 1516 and memory 1514 store the instructions 1510 embodying any one or more of the methodologies or functions described herein. The instructions 1510 may also reside, completely or partially, within the memory 1514, within the storage unit 1516, within at least one of the processors 1504 (e.g., within the processor's cache memory), or any suitable combination thereof, during execution thereof by the machine 1500. Accordingly, the memory 1514, the storage unit 1516, and the memory of the processors 1504 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1510. The term "machine-readable medium" shall also be taken to include any medium, or combination of multiple media, that is capable of storing instructions (e.g., instructions 1510) for execution by a machine (e.g., machine 1500), such that the instructions, when executed by one or more processors of the machine (e.g., processors 1504), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1518 may include a wide variety of components to receive input, provide output, produce output, transmit information, exchange information, capture measurements, and so on. The specific I/O components 1518 that are included in a particular machine will depend on the type of machine. For example, portable machines such as mobile phones will likely include a touch input device or other such input mechanisms, while a headless server machine will likely not include such a touch input device. It will be appreciated that the I/O components 1518 may include many other components that are not shown in FIG. 15. The I/O components 1518 are grouped according to functionality merely for simplifying the following discussion, and the grouping is in no way limiting. In various example embodiments, the I/O components 1518 may include output components 1526 and input components 1528. The output components 1526 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1528 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1518 may include biometric components 1530, motion components 1534, environmental components 1536, or position components 1538 among a wide array of other components. For example, the biometric components 1530 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1534 may include acceleration sensor components (e.g., accelerometer), gravitation sensor components, rotation sensor components (e.g., gyroscope), and so forth. The environmental components 1536 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1538 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1518 may include communication components 1540 operable to couple the machine 1500 to a network 1532 or devices 1520 via a coupling 1524 and a coupling 1522, respectively. For example, the communication components 1540 may include a network interface component or other suitable device to interface with the network 1532. In further examples, the communication components 1540 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1520 may be another machine or any of a wide variety of peripheral devices (e.g., a peripheral device coupled via a USB).

Moreover, the communication components 1540 may detect identifiers or include components operable to detect identifiers. For example, the communication components 1540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1540, such as location via Internet Protocol (IP) geo-location, location via Wi-Fi® signal triangulation, location via detecting an NFC beacon signal that may indicate a particular location, and so forth.

In various example embodiments, one or more portions of the network 1532 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1532 or a portion of the network 1532 may include a wireless or cellular network and the coupling 1524 may be a Code Division Multiple Access (CDMA) connection, a Global System for Mobile communications (GSM) connection, or another type of cellular or wireless coupling. In this example, the coupling 1524 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1510 may be transmitted or received over the network 1532 using a transmission medium via a network interface device (e.g., a network interface component included in the communication components 1540) and utilizing any one of a number of well-known transfer protocols (e.g., hypertext transfer protocol (HTTP)). Similarly, the instructions 1510 may be transmitted or received using a transmission medium via the coupling 1522 (e.g., a peer-to-peer coupling) to the devices 1520. The term "transmission medium" shall be taken to include any intangible medium that is capable of storing, encoding, or carrying the instructions 1510 for execution by the machine 1500, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   one or more processors; and
   a non-transitory machine-readable storage medium including instructions that, when executed by the one or more processors of a machine, cause the machine to perform operations comprising:
   analyzing an input publication to detect one or more violations of optimization rules;
   outputting, via a user interface, a preview of the input publication to be displayed on a particular computing device along with one or more optimization actions to fix the one or more violations of the optimization rules;
   receiving user input to select at least one of the one or more optimization actions;
   updating the preview responsive to the user input; and
   displaying, via the user interface, both the updated preview of the input publication and a visual indication that the selected at least one optimization action has been performed to fix the one or more violations of the optimization rules, the visual indication displayed proximate the updated preview in the user interface.

2. The system of claim 1, wherein the particular computing device is selected from a plurality of computing devices on which the input publication is to be displayed.

3. The system of claim 1, wherein the analyzing is based on matching the input publication with a standardized publication, the standardized publication having content that is optimized to be displayed on a plurality of devices.

4. The system of claim 3, wherein the one or more optimization actions are derived from the standardized publication.

5. The system of claim 1, the operations further comprising receiving user input to save and publish an updated input publication.

6. The system of claim 1, wherein the one or more optimization actions are notifications indicating that manually editing underlying code of the input publication is necessary to fix the one or more violations of the optimization rules.

7. The system of claim 1, the operations further comprising providing an additional user interface element selectable to revert changes applied to the input publication by the performance of the selected at least one optimization action.

8. The system of claim 1, wherein the updated preview of the input publication includes changes to the input publication based on the selected at least one optimization action.

9. The system of claim 1, the operations further comprising displaying a notification indicating that the input publication is optimized for display on the particular computing device responsive to performance of the selected at least one optimization action.

10. The system of claim 1, wherein the preview comprises a simulation of the input publication being displayed on the particular computing device, and wherein the updated preview comprises an updated simulation of the input publication being displayed on the particular computing device after performance of the selected at least one optimization action.

11. A method comprising:
    receiving, by at least one processor of at least one server, an input publication to be displayed on a particular computing device;
    analyzing, by the at least one processor of the at least one server, the input publication to detect one or more violations of optimization rules;
    outputting, by the at least one processor of the at least one server, a preview of the input publication to be displayed on the particular computing device along with one or more optimization actions to fix the one or more violations of the optimization rules;
    receiving, by the at least one processor of the at least one server, user input to select at least one of the one or more optimization actions;
    updating the preview responsive to the user input; and
    display, by the at least one processor of the at least one server, both the updated preview of the input publication and a visual indication that the selected at least one optimization action has been performed to fix the one or more violations of the optimization rules.

12. The method of claim 11, wherein the particular computing device is selected from a plurality of computing devices on which the input publication is to be displayed.

13. The method of claim 11, wherein the analyzing is based on matching the input publication with a standardized publication, the standardized publication having content that is optimized to be displayed on a plurality of devices.

14. The method of claim 11, further comprising receiving user input to save and publish an updated input publication.

15. The method of claim 11, wherein the updated preview of the input publication includes changes to the input publication based on the selected at least one optimization action.

16. A non-transitory machine-readable storage medium including instructions that, when executed by one or more processors of a machine, cause the machine to perform operations comprising:
   analyzing an input publication to detect one or more violations of optimization rules;
   outputting, via a user interface, a preview of the input publication to be displayed on a particular computing device along with one or more optimization actions to fix the one or more violations of the optimization rules;
   receiving user input to select at least one of the one or more optimization actions;
   updating the preview responsive to the user input; and
   displaying, via the user interface, both the updated preview of the input publication and a visual indication that the selected at least one optimization action has been performed to fix the one or more violations of the optimization rules.

17. The non-transitory machine-readable storage medium of claim 16, wherein the particular computing device is selected from a plurality of computing devices on which the input publication is to be displayed.

18. The non-transitory machine-readable storage medium of claim 16, wherein the analyzing is based on matching the input publication with a standardized publication, the standardized publication having content that is optimized to be displayed on a plurality of devices, and wherein the one or more optimization actions are derived from the standardized publication.

19. The non-transitory machine-readable storage medium of claim 16, wherein the operations further comprise receiving user input to save and publish the updated input publication.

20. The non-transitory machine-readable storage medium of claim 16, wherein the updated preview of the input publication includes changes to the input publication based on the selected at least one optimization action.

* * * * *